Jan. 7, 1941.  M. C. INDAHL  2,227,935

PHOTOCOMPOSING EQUIPMENT

Filed Aug. 19, 1939  5 Sheets-Sheet 1

INVENTOR:
Mauritz C. Indahl,

BY John A. Ferguson
HIS ATTORNEY.

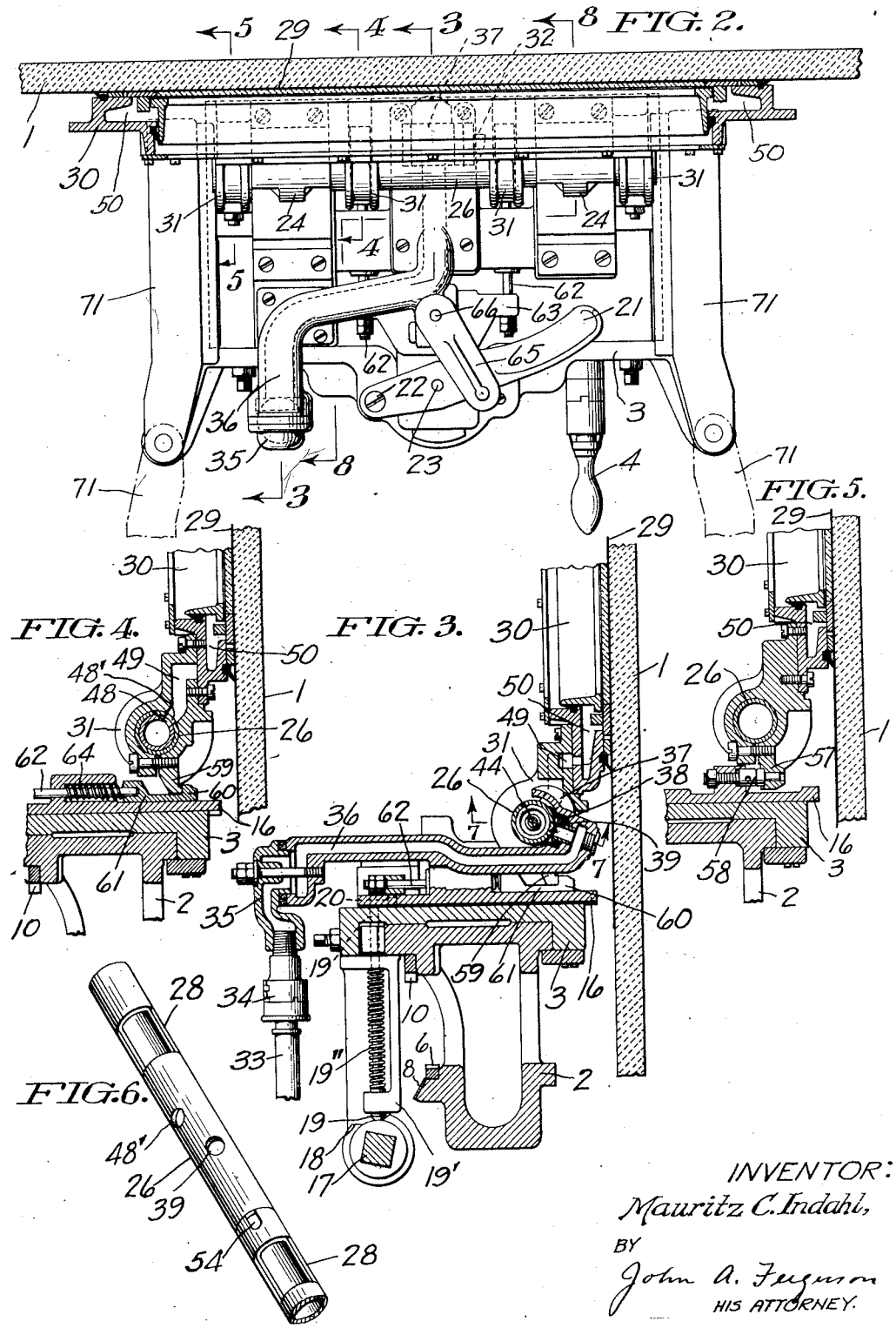

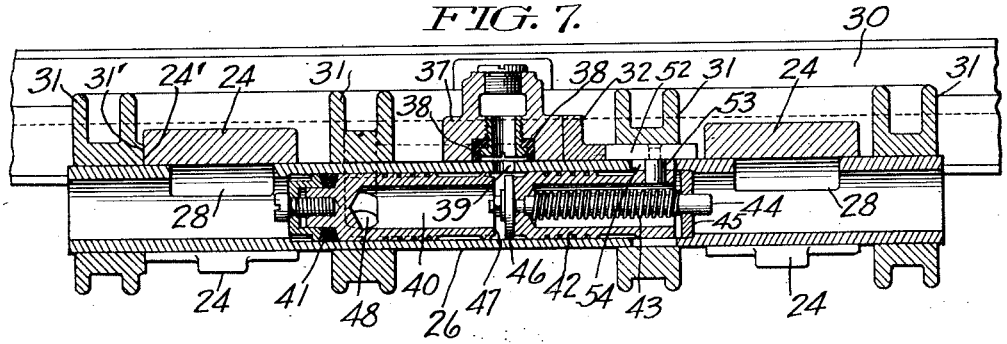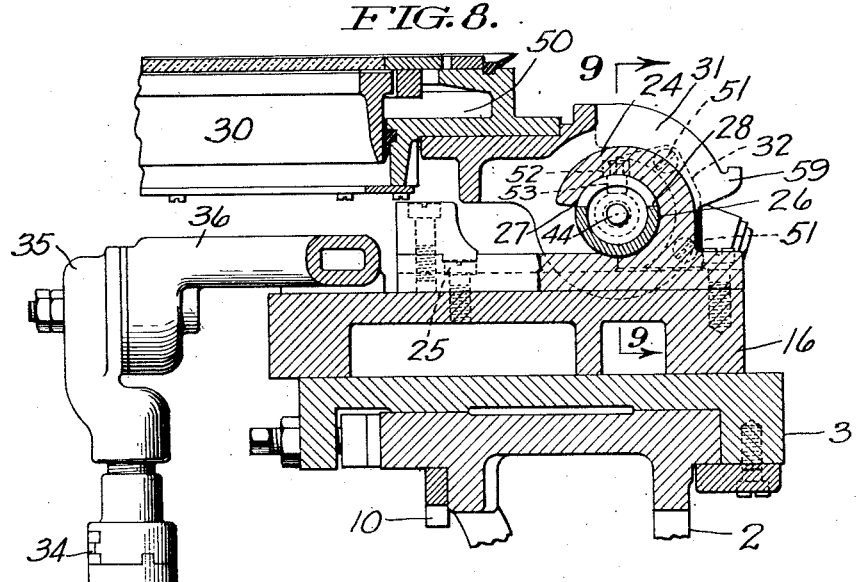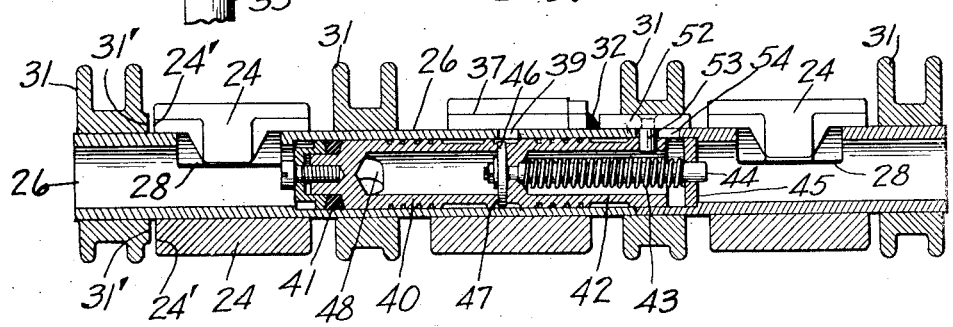

Jan. 7, 1941.    M. C. INDAHL    2,227,935
PHOTOCOMPOSING EQUIPMENT
Filed Aug. 19, 1939    5 Sheets-Sheet 4
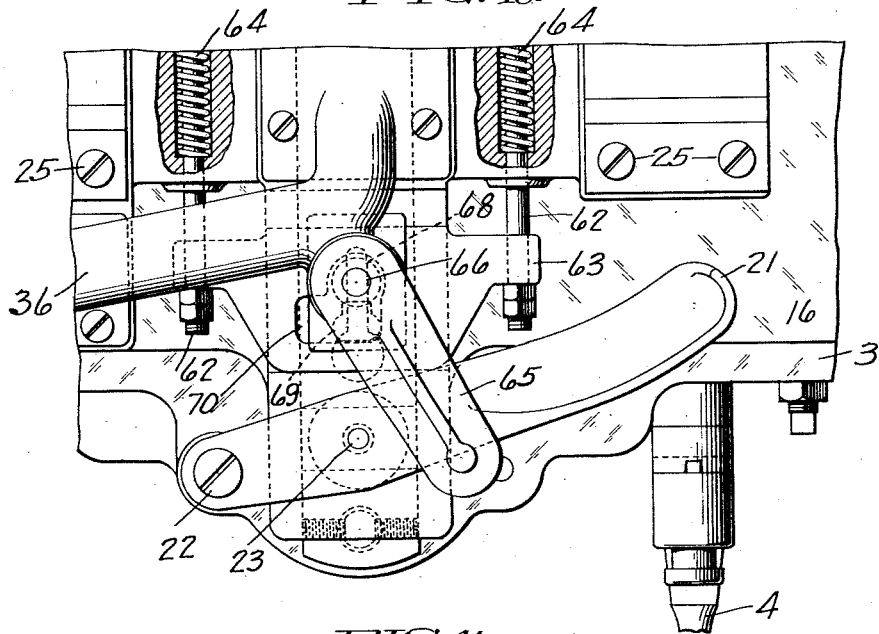
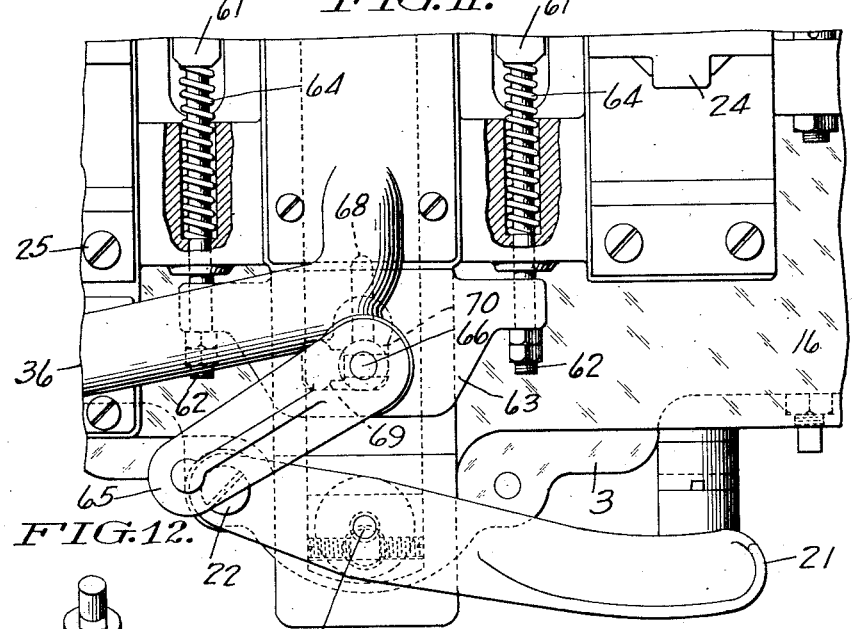
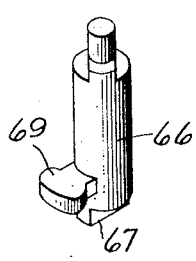
INVENTOR:
Mauritz C. Indahl,
BY
John A. Ferguson
HIS ATTORNEY.

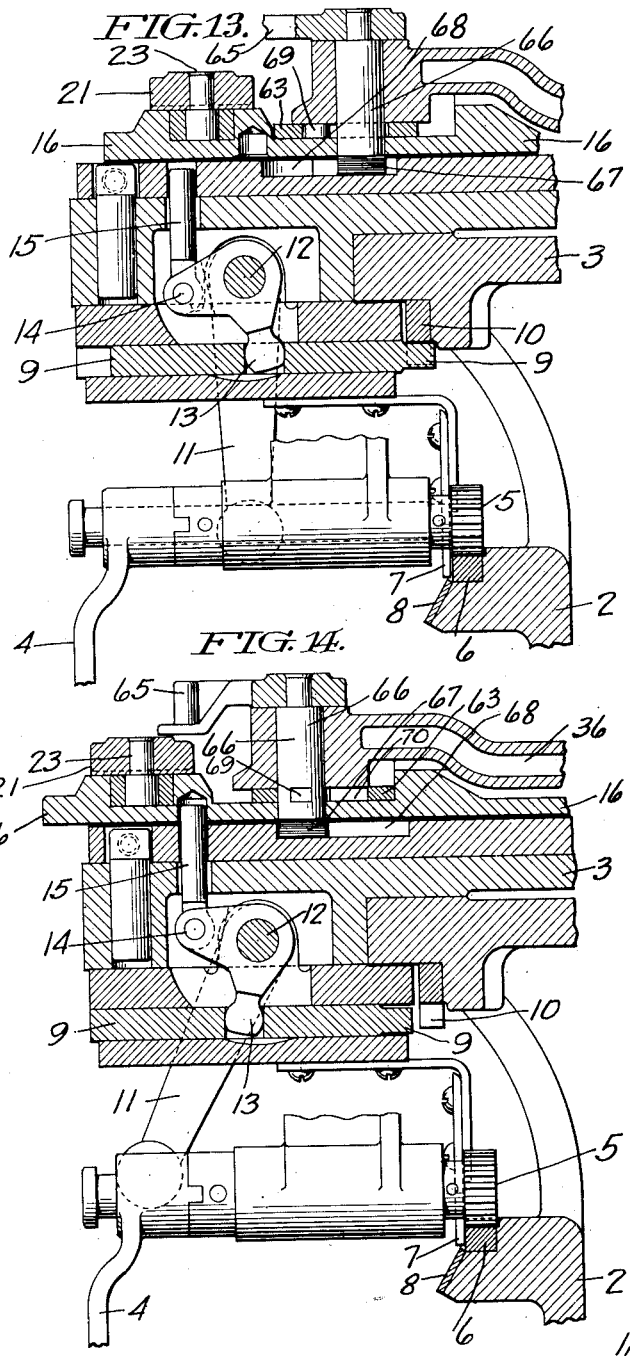

Patented Jan. 7, 1941

2,227,935

UNITED STATES PATENT OFFICE 2,227,935

PHOTOCOMPOSING EQUIPMENT

Mauritz C. Indahl, Rydal, Pa., assignor to Lanston Monotype Machine Company, Philadelphia, Pa., a corporation of Virginia Application August 19, 1939, Serial No. 290,936

11 Claims. (Cl. 95—76)

This invention relates to photocomposing equipment and particularly to coupling and positioning mechanisms by which various attachments in connection with the art of photocomposing are applied to machines used in said art, such as; photocomposing machines, vacuum frames, registering tables, photocomposing cameras and the like. The attachments may take the form of negative holders and similar holder devices which are necessary to be applied to photocomposing equipment in various positions and with extreme accuracy. Various sizes of negative holders and the like are adapted to be applied by means of identical coupling mechanisms so that their application is a mere manual operation taking a minimum of time. At times, it is necessary to draw or scribe lines on negatives or positives and the attachment may in those cases take the form of scribing devices, and all of the coupling mechanisms are preferably common to all attachments of any size so that they may be readily applied interchangeably to the same machine or to various machines.

The main object of the invention is to produce such coupling mechanism as will register or position the attachment with respect to the machine with which it is used in an extremely precise manner, every positioning and repositioning being accurate to a degree approaching perfection, and the operation of positioning being simple and quick in contrast to the laborious and time consuming operation of forming a similar coupling of elements by the well-known employment of dowel pins and holes.

Another object is to produce a coupling mechanism which is capable of being positioned by resting the attachment upon a platform located on the machine and then by a combined motion of pushing and turning, accomplishing the coupling together of the elements in fixed relation, the accuracy of positioning being accomplished by automatic means.

A further object is to provide a coupling mechanism in which vacuum channels and valved means are provided by which the act of positioning is accompanied automatically by the connection of the vacuum spaces of the attachment with the vacuum supply line associated with the machine.

Another object is the production of photocomposing equipment having novel features of construction and particularly of photocomposing machines provided with locking devices to prevent improper manipulation of the various movable elements of the machine.

Other objects of the invention will be hereinafter specifically pointed out or will otherwise appear in connection with the following description of the embodiment of the invention shown in the accompanying drawings forming a part of this specification, in which Fig. 1 is a face view of a negative holder applied to a vertical type of photocomposing machine and embodying the present invention.

Fig. 2 is a horizontal section on approximately line 2—2 of Fig. 1.

Fig. 3 is a vertical section on approximately line 3—3 of Fig. 2.

Fig. 4 is a vertical section on approximately line 4—4 of Fig. 2.

Fig. 5 is a vertical section on approximately line 5—5 of Fig. 2.

Fig. 6 is a perspective view of a shaft element of the coupling mechanism.

Fig. 7 is an enlarged horizontal section on approximately line 7—7 of Fig. 3.

Fig. 8 is a vertical section on approximately line 8—8 of Fig. 2 but with the attachment in horizontal position.

Fig. 9 is a vertical section on approximately line 9—9 of Fig. 8, this view being similar to that of Fig. 7 but with the vacuum valve in closed position.

Fig. 10 is an enlarged view similar to Fig. 2 and showing in particular the means for retaining the negative holder in vertical position.

Fig. 11 is a view similar to that of Fig. 10 with the retaining device locked out of action.

Fig. 12 is a perspective view of the operating pin or shaft of the retaining device.

Fig. 13 is a vertical section showing the sliding saddle locked against movement.

Fig. 14 is a similar view to that of Fig. 13 with the saddle unlocked but with the sliding platform for the attachment in locked position.

The attachment shown is a vacuum negative holder, and the photocomposing equipment with which it is shown coupled is a vertical photocomposing machine of any known construction, such as the photocomposing machine in part represented in general form by United States Letters Patent No. 1,932,671. The negative holder shown is somewhat similar in general construction to that shown in United States Letters Patent No. 1,978,493. Any other suitable types of holder and machine may be employed, those shown being chosen for illustrative purposes only.

Figure 1:
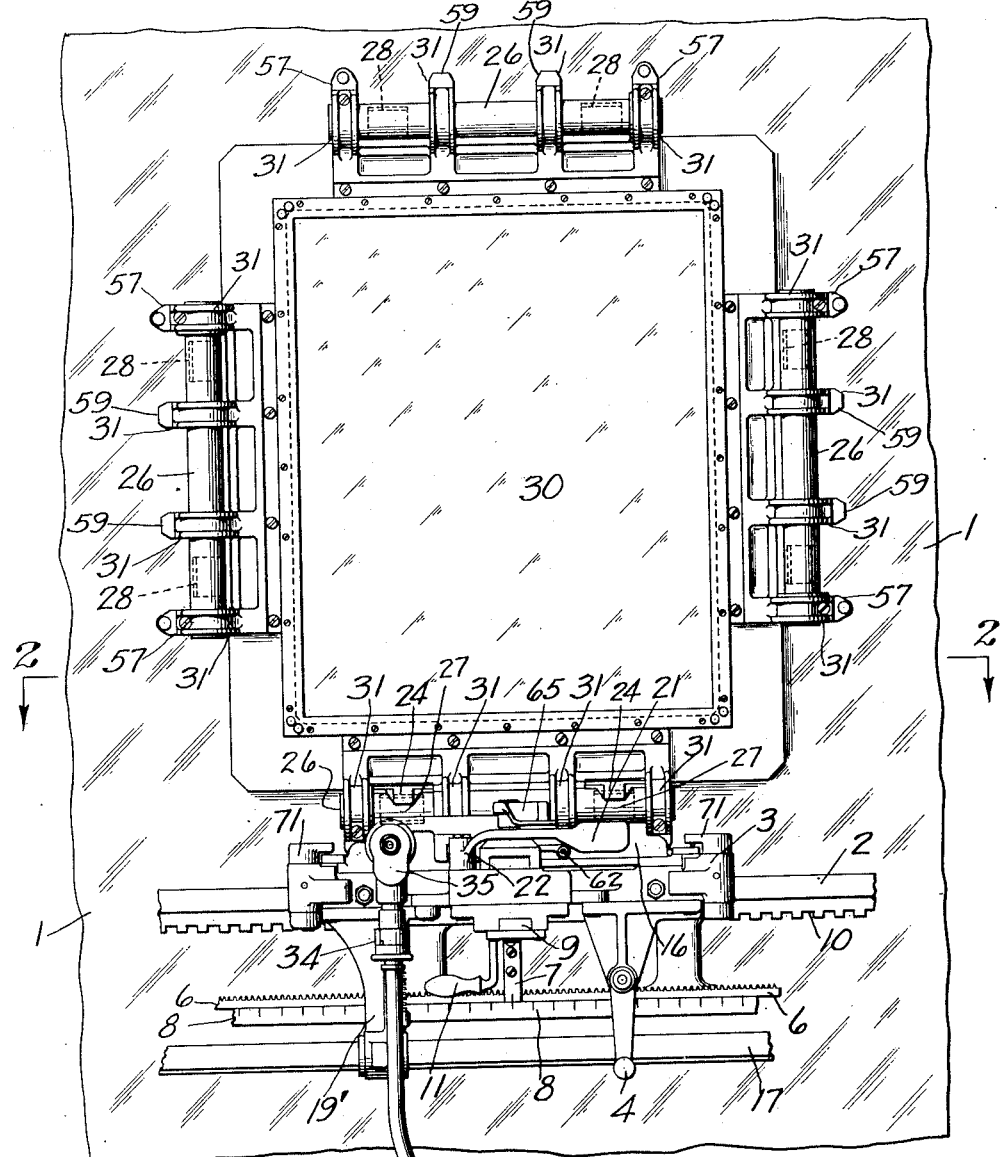

The fragmentary representation of the photocomposing machine in Fig. 1 includes the support 1 for the sensitized sheet or press plate upon which the negative image is to be received, and the notchbar monorail 2 positioned horizontally in front of the support and capable of being moved bodily parallel to the support in a vertical direction, and also horizontally to a slight extent for the purpose of obtaining fine adjustments of position for the negative holder. These parts and their construction and operation, as well as other constructions of a photocomposing machine of the kind illustrated, will be well understood by those skilled in the art and need not be further illustrated or explained here.

The saddle which holds the negative holder and which is slidable horizontally along the rail 2 is indicated at 3. It is driven by the handle lever 4 and gear 5 (Figs. 13 and 14) which latter meshes with the rack 6 carried on the rail 2, its position being shown by the pointer 7 reading on the scale 8. When the saddle has been moved by the operation of lever 4 to a coarsely predetermined position represented by a notch in the notchbar it is locked in such position by the locking bar 9 entering the spaces of the notchbar 10. This locking is accomplished by the operation of lever 11 which, as is clearly shown in Figs. 13 and 14, is mounted on the shaft 12 keyed to a bell crank lever, the lower arm 13 of which works in a slot in the locking bar 9 to drive the latter into locking position between adjacent teeth of the notchbar 10, as shown in Fig. 13, or in unlocked position as shown in Fig. 14.

Another arm 14 of the bell crank lever operates a vertically disposed locking pin 15 to control the platform 16 carried on the saddle 3. The handle lever 11 may not be operated to withdraw the bar 9 from locking position unless the platform 16 has been drawn back away from the support 1 so that a recess in its underface may thus be positioned for the reception of the vertical locking pin 15. As shown in Fig. 14, the pin 15 has entered this recess in the plaftorm 16 to prevent the latter from being moved inwardly toward the support 1 while the locking bar 9 is in unlocked position. In this position of the parts the saddle 3 may be moved along the rail 2 by the operation of lever 4. In Fig. 13 the platform 16 is positioned in its inward position toward the support 1 and under such condition obviously the locking bar 9 may not be withdrawn from the notch bar and the saddle 3 may not be moved along the rail 2.

It may also be pointed out that means (not shown) for raising and lowering the rail 2 are provided including vertical notchbars adapted to be engaged by locking pins which are operated by the rocking shaft 17 (Figs. 1 and 3). This shaft is turned slightly in order to lock and unlock the vertical movement of the rail 2 and when it is turned to withdraw the locking bars, the cam 18 (Fig. 3) on the shaft 17 raises the pin 19 which is carried on a bracket 19' depending from the carriage 3. The raising of this pin 19 is accomplished against the force of a surrounding spring 19''. The upper end of the pin 19 contacts against the under surface of the platform 16 when the platform is positioned in its innermost position and the vertical movement of the rail 2 is thus prevented because it cannot be unlocked. However, when the platform 16 is in its out position a recess 20 (Fig. 3) in its underside is in position for the reception of the pin 19 and the latter may be operated thus unlocking the rail 2 and permitting the upward or downward movement thereof. It will be seen then that the rail 2 cannot be raised or lowered unless the platform 16 is in its removed or out position and also that the saddle 3 cannot be slid along the rail unless the same condition exists.

The platform 16 is carried on the saddle 3 which latter is provided with transverse ways on which the platform may be slid toward and from the support 1 in a direction perpendicularly thereto and transversely of the saddle. This movement is produced by the operation of the lever 21 pivoted at 22 to the saddle and at an intermediate point 23 to the platform 16. In the position of the lever 21 shown in Fig. 10 the platform 16 is in its innermost position toward the sensitized plate support 1. Fig. 11 shows it in its removed position.

The inner end of the platform 16, that is, the portion near the support 1, is provided with a bearing for the negative holder or other attachment to be applied to the photocomposing machine. This bearing is formed preferably by two upturned lips to form bosses 24 which, as shown, are secured to the platform 16 by screws 25 (Fig. 8). The bosses are bored longitudinally to receive the cylindrical shaft 26 carried by the attachment to be applied to the photocomposing machine, which attachment in this case is a negative holder 30. The forward portions of the bosses are slotted at 27 and the shaft 26 is provided with flat surfaces at 28 or is otherwise cut away so as to slide readily through the slots 27 when the holder is in the down or noncontacting position shown in Fig. 8. When, however, the shaft 26 has been entered in this manner into the bearing formed by the bosses, that is, by sliding the holder shaft toward the support 1, the holder may then be rotated to a vertical position and thus lock the shaft within the bearing. This vertical or working position of the holder is shown in Figs. 3, 4 and 5 in which the platform 16 is also shown forward and the negative holder in contact with the sensitized plate carried by the support 1. In these figures the sensitized plate is shown as a heavy line indicated by the reference character 29.

Figure 15:
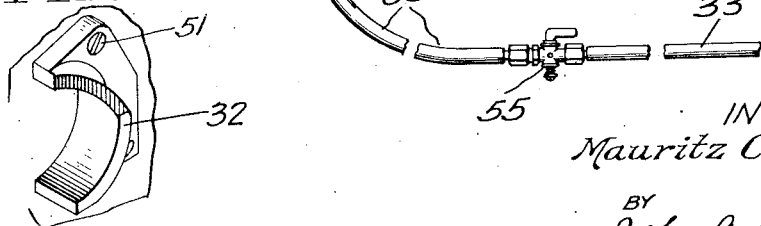
Fig. 15 is a perspective view of the cam device for positioning the attachment automatically under spring tension and for automatically opening the vacuum valve which is a part of the coupling mechanism shown.

The negative holder which has been indicated by reference character 30 may be provided with one or more shafts 26 and in Fig. 1, four are shown, one on each of the four sides of the negative holder. These shafts also serve as handles by which the operator may readily carry the holder and otherwise manipulate it. The shafts are each clamped or otherwise securely fastened into lugs 31 projecting from the face of the holder on one side thereof and near one edge so as to project beyond such edge. These lugs as shown are four in number and are positioned so as not to interfere with the bearings 24 of the photocomposing machine when the holder is being positioned with reference thereto. One of the lugs 31, that at the left in Figs. 1, 7 and 9, is positioned so that its inner face 31' is spaced slightly from the outer face 24' of the bearing 24, when the attachment is being applied to the machine (Fig. 9). A cam is provided for causing these surfaces to contact under spring pressure, when the attachment is moved to operative position. As shown the cam 32 (Figs. 7, 9 and 15) secured to the platform 16, in a manner to be described hereinafter, contacts with a portion of the attachment to bring the faces 31' and 24' into contact, as will be readily understood, when the negative holder is raised to vertical position (Fig. 7). This causes the negative holder to be accurately positioned with reference to the photocomposing machine and its sensitized plate. This precise positioning with the surfaces 31' and 24' in bearing contact always occurs when a negative holder of any size is applied to the machine, and repositioning at any time is always the same as before. The operator has no accurate positioning problems because he enters the shaft 26 into the bearings 24 with the negative holder flat or approaching the horizontal at which time there is plenty of space between the lugs 31 and the bearings 24 (Fig. 9). It is only when he rotates the holder toward the vertical that the cam 32 operates to bring the surfaces 31' and 24' into bearing relation (Fig. 7). This precision positioning is therefore automatic, which has not been the case in previous constructions such as dowel pins and holes. Obviously this gives the operator a much easier and quicker positioning action. Moreover, he does not have to hold up the weight of the negative holder physically while endeavoring to obtain precision positioning because he slides the coupling parts together while the holder is resting on the platform 16. It will be seen that speed and ease have been provided for the application of attachments to photocomposing equipment and their removal therefrom.

Attachments such as negative holders are often provided with vacuum channels and passages and the present invention provides for the automatic connection of these passages to the vacuum line leading from the vacuum pump or other suitable source of vacuum. This vacuum line comprises the flexible hose 33, the connector coupling 34 and the swivel joint connection 35, a part of the latter being continued in the form of a channel 36 which is carried by the platform 16 and may, as shown, be integral therewith. The swivel connection is preferably at one side of the center of the platform and is curved over as shown in Fig. 2 to a central point where a coupling is provided between the channel 36 and the shaft 26 which as shown is a hollow shaft, the central portion being packed to maintain a partial vacuum produced through the line 33.

The connection between the hollow shaft 26 and the passage 36 is provided by the extension of said passage partly around the shaft in the form of a lip 37 which curves around a portion of the shaft and is provided with a packing 38 of rubber or other suitable material which contracts with the shaft and makes a vacuum proof joint when the shaft has been inserted into the bearings 24. An aperture or entrance port 39 at this point in the shaft connects the latter with the vacuum line 36.

The sealing of the central portion of the shaft 26 is shown particularly in Figs. 7 and 9. A hollow plug 40 within the hollow of the shaft is provided with suitable packing 41 by which air may not leak around the plug into the central portion of the shaft. Within the hollow of the shaft and in line with the plug 40 is a movable plug or piston 42, which is hollow for the reception of the coil spring 43 surrounding the pintle 44 which extends longitudinally from the inner end of the plug to a fixed wall 45 located within the shaft 26 and seated against a shoulder therein. This wall 45 is centrally apertured so that the pintle 44 may project therethrough and the spring 43 rests at one end against the wall 45 and at its other end against a shoulder formed within the piston 42. The outer end of the piston 42 is provided with a valve 46 in the form of a circular button of leather, rubber or the like and this valve sits against the valve seat 47 (Fig. 7) formed by the adjacent end of the plug 40. In Fig. 9 the valve is seated against the plug 40 and in Fig. 7 is shown in open position. The hollow portion of the plug 40 is provided with an aperture 48 which leads through the shaft aperture 48' to a hollow passage 49 in the lug 31 of the negative holder. This passage 49 communicates through other apertures provided in the negative holder with the chamber 50 therein, this chamber extending around the four sides of the negative holder and in any well known manner maintaining a vacuum between the negative carried by the negative holder and the sensitized plate 29 of the photocomposing machine. The vacuum passages leading from the negative holder through the channels 49 and 48 also communicate with the vacuum line 36. The control of the valve 46 against its spring 43 is provided in the form of the cam 32 previously referred to. This cam is secured by screws 51 (Figs. 8 and 15) to the side of the lip 37 being fixed with respect to the negative holder and its cam surface operates against a plate or contactor 52 carried on the outside of the shaft 26 and being connected by a rivet 53 to the valve piston 42, the rivet extending through a slot 54 in the shaft 26. It will be seen that when the shaft 26 is being entered into the bearing 24, the negative holder being in a flat position as shown in Fig. 8, the cam 32 does not exert any influence upon the plate 52 and the valve 46. There is no resistance to this action of inserting the coupling members together at which time the shaft 26 is brought firmly against the packing 38. However, when the negative holder is rotated toward vertical position on the axis of its shaft 26, the plate 52 rubs against the cam surface 32 and is caused to move outwardly against the action of the spring 43 to open the valve 46. Also the port 39 is brought into alignment with the passage 36. It is obvious that the cam 32 works against the action of the spring 43 not only to move the negative holder bodily in such a manner as to cause the seating of the surfaces 31' and 24' heretofore mentioned, but also to cause the valve 46 to retreat from the valve seat 47 and thus open the valve to connect the vacuum line with the negative holder. This opening is entirely automatic just as the precise positioning of the negative holder with respect to the sensitized plate is entirely automatic. Vacuum is set up in the attachment by the opening of the valve 55 which is diagrammatically shown in Fig. 1 and which is so constructed that upon its closing the vacuum in the negative holder is broken. One or more of the outermost lugs 31 of the negative holder is provided with an extension 57 which when the negative holder is in vertical or operating position comes against the stop 58 shown particularly in Fig. 5. This stop is provided with screw-threads so that it can be finely adjusted to bring the negative holder into precise contact with the sensitized plate 29. The stop 58 is carried on the upper surface of the platform 16 in any suitable manner.

The two central lugs 31 are also each provided with an extension 59 (Fig. 4) which extensions come against lugs 60 carried on slidable members 61 which are connected by rods 62 to the equalizing crosshead or yoke 63 (Figs. 10 and 11). Coil springs 64 located in recesses in the platform 16 and surrounding the rods 62 tend to cause the slidable members to move toward the sensitized plate. These members are drawn away from the plate by action of a handle 65. This handle is secured to a vertical pivot 66, the reduced and flattened end 67 of which rests in a key-slot 68 in the upper surface of the carriage 3. When the platform 16 is withdrawn to its outermost position as shown in Fig. 14 the pivot end 67 is seated in the circular part of the key-slot 68 so that the handle 65 secured to the pivot 66 may be turned. Intermediate of the ends of the pivot 66 is provided a cam member 69 which extends at right angles to the axis of the pivot 66 and a recess 70 is provided in the yoke 63 for this cam projection 69. This recess 70 is L-shaped as shown clearly in Figs. 10 and 11. When the lower end of the pivot is in the circular part of the key-slot previously mentioned and the platform 16 is in outermost position, the handle 65 may be turned from the position shown in Fig. 11 to the position shown in Fig. 10; such turning accomplishes through the cam 69 and the recess 70 a withdrawal of the yoke 63 from the position shown in Fig. 11 to the position shown in Fig. 10. The platform 16 may now be moved toward the sensitized plate by the operation of lever 21 and this causes the lower flattened end 67 of the pivot 66 to enter into the channeled part of the key-slot 68. The flattened portion 67 fits slidably into this channel portion of the key-slot, but cannot be rotated and so the handle 65 may not be operated back to the position shown in Fig. 11. In other words, the yoke 63 can be withdrawn so as to pull the slidable members 61 away from the sensitized plate against the action of springs 64 only when the platform 16 is in its position furthest removed from the sensitized plate which position is shown in Fig. 11.

The slidable members 61 provided with upstanding lugs 60 operate in conjunction with the yoke 63 and handle device 65, as a retaining device for the attachment to hold it in vertical position and prevent it from falling toward the operator. The operation of placing the attachment shaft 26 in the bearings 24 of the platform 16 is accomplished when the platform 16 is removed from proximity to the sensitized plate and its support 1 at which time the members 61 are forward or closer to said sensitized plate and the handle 65 is in the position shown in Fig. 11. In such position the extensions 59 of the lugs 31 are free to enter behind the upstanding lugs 60 of the retaining device as shown in Fig. 4. Then the handle 65 may be operated to the position shown in Fig. 10 and this draws the lugs 60 firmly against the lugs 59 and holds the attachment in vertical position. When so held it cannot fall toward the operator and become damaged. When so held the lever 21 may be operated to move the platform 16 toward the sensitized sheet until the attachment or negative holder is seated properly against the sensitized sheet. The adjustable stop 58 (Fig. 5) is so positioned that the contact between the negative holder and sensitized plate is precise and the operator may now turn the valve 55 to produce a vacuum in the negative holder and cause it to adhere tightly to the sensitized plate. It will be obvious to anyone skilled in the art that the braking of the vacuum is accomplished by turning valve 55 and the removal of the negative holder may easily be accomplished by proper operation of the lever handles 21 and 65. It is also to be noted that a locking system has been provided for all of the movable elements which locks them against movement except when the platform is in its removed position from the support. In inserting and removing the negative holder the supports 71 shown particularly in Fig. 2 may be turned from their normal position shown in full lines to their outer position shown in dot-and-dash lines, these supports being useful in order to support the weight of the negative holder while being worked on in horizontal position.

It will, of course, be understood that the present invention is not to be restricted to the precise construction shown in the drawings, but various changes of construction may be made within the scope of the invention as defined by the appended claims.

I claim:

1. Photocomposing equipment comprising a machine having a support for a surface to be operated upon, a platform slidable toward and from said support and provided with a shaft bearing with a cut away portion to form an entrance slot, and in combination therewith a holder for an instrumentality to contact with and operate upon said surface, said holder being provided with a projecting lug, a shaft held by said lug and provided with a flattened portion corresponding to said entrance slot to permit entrance of said shaft laterally into said bearing when the holder is moved toward said support in approximately horizontal, non-operating position, said shaft being locked in said bearing upon the rotation of the holder upon the axis of the shaft to vertical, operating position, and cam and spring means for exerting pressure upon the holder longitudinally of the shaft to position the lug in contact with the bearing and thus cause the holder to be precisely positioned with respect to said surface.

2. A photocomposing machine comprising coupling mechanism including fixed and movable elements, a shaft bearing on one of said elements, having a cut away portion to form an entrance slot, a lug and a shaft on the other of said elements, the shaft having a flattened portion corresponding to said entrance slot to permit entrance of said shaft laterally into said bearing whereby upon rotation of said movable element upon the axis of the shaft when the shaft is in said bearing the elements are locked together and cam and spring means between the elements, including means contacting with the cam during said rotation for exerting pressure on the elements to cause the lug to contact with the bearing and thus cause the elements to be precisely positioned with respect to each other.

3. A photocomposing machine comprising a support for a sensitized surface, a platform provided with shaft bearings, a negative holder having projecting lugs and a hollow shaft carried by said lugs and adapted to be seated in said bearings whereby the shaft and bearings act as a coupling means between the machine and the negative holder, a port leading from the shaft chamber to the vacuum passages of the negative holder, a channel leading from the vacuum line to the shaft and an entrance port located in the shaft to connect the said vacuum passages with said channel when the negative holder is in operating position.

4. A photocomposing machine comprising a support for a sensitized surface, a platform provided with shaft bearings, a negative holder having projecting lugs and a hollow shaft carried by said lugs and adapted to be seated in said bearings whereby the shaft and bearings act as a coupling means between the machine and the negative holder, a port leading from the shaft chamber to the vacuum passages of the negative holder, a channel leading from the vacuum line to the shaft and an entrance port located in the shaft to connect the said vacuum passages with said channel when the negative holder is in operating position and a cam and spring means through which the cam acts to move one of said lugs in contact with one of said bearings to precisely position the negative holder with respect to said support.

5. A photocomposing machine comprising a platform provided with shaft bearings, a negative holder provided with projecting lugs and a hollow shaft for co-operation with said bearings to hold the negative holder in precise position upon said machine, valve means within said shaft to form a chamber therein, including a spring to normally retain the valve in closed position and a contactor secured to the valve and located externally of the shaft, a cam on the platform adapted to move said contactor to open the valve upon the rotation of the negative holder upon the axis of the shaft to vertical, operating position, a port leading from the shaft chamber to the vacuum passages of the negative holder, a channel leading from the vacuum line to an entrance port in the shaft located for communication with said channel, whereby the rotation causes automatically both the definite positioning of the negative holder with one of its lugs in contact with one of the bearings of the platform and the opening of the valve to connect said vacuum line with said negative holder vacuum passages.

6. A photocomposing machine comprising a support, a platform slidable toward and from said support and provided with shaft bearings having cut away portions to form entrance slots, and in combination therewith a negative holder having projecting lugs, a hollow shaft held by said lugs and having flattened portions corresponding to said entrance slots to permit entrance of said shaft laterally into said bearings when the negative holder is moved toward said support in approximately horizontal, non-operating position, valve means within the said shaft to form a chamber therein including a spring to normally retain the valve in closed position and a contactor secured to the valve and located externally of the shaft, a cam on the platform adapted to move said contactor to open the valve upon the rotation of the negative holder upon the axis of the shaft to vertical, operating position, a port leading from the shaft chamber to the vacuum passages of the negative holder, a channel leading from the vacuum line to an entrance port in the shaft located for communication with said channel, whereby the said rotation causes automatically both the definite positioning of the negative holder with one of its lugs in contact with one of the bearings of the platform and the opening of the valve to connect said vacuum line with said negative holder vacuum passages.

7. A photocomposing machine comprising a support for a sensitized surface, a platform slidable toward and from said support, a negative holder on said platform held in precise location with respect thereto and being provided with extensions, a retaining device on the platform for holding the negative holder in position parallel to said sensitized surface and comprising slidable member provided with lug adapted to come against said extensions, an equalizing cross-head connected to said member, spring means for normally retaining said slidable member in position toward said sensitized surface and means for operating said cross-head against the spring action to bring the lug of the slidable member into contact with the extensions of the negative holder to retain the latter in position parallel to the sensitized surface.

8. A photocomposing machine comprising a support for a sensitized surface, a platform slidable toward and from said support and provided with a shaft bearing and in combination therewith a negative holder having a projecting lug, a shaft held by said lug and being insertable into said bearing whereby the negative holder is coupled with said platform, said negative holder being provided with extensions, a retaining device on the platform for holding the negative holder in position parallel to said sensitized surface, and comprising slidable members provided with lugs adapted to come against said extensions, an equalizing cross-head connected to said members, spring means for normally maintaining said slidable members in position toward said sensitized surface and means for operating said cross-head against the spring action to bring the lugs of the slidable members into contact with the extensions of the negative holder to retain the latter in position parallel to the sensitized surface.

9. A photocomposing machine comprising a support for a sensitized surface, a monorail extending in front of said support and movable in a plane parallel thereto, a saddle slidable on said monorail, a platform on said saddle slidable toward and away from said support, a negative holder coupled to said platform and adapted to contact with said surface, said negative holder being provided with an extension, a retaining device on said platform for holding the negative holder parallel to said surface, and comprising a slidable member provided with a lug adapted to come against said extension, spring means for normally maintaining said slidable member in position toward said sensitized surface, means for operating said slidable member against the spring action to bring the lug of the slidable member into contact with the extension of the negative holder, a locking device carried by the platform and co-operating with a key slot formed in the saddle to lock the retaining device against movement when the platform is in its position nearest to said sensitized surface.

10. A photocomposing machine comprising a support for a sensitized surface, a monorail extending in front of said support and movable in a plane parallel thereto, a saddle slidable on said monorail, a platform on said saddle slidable toward and away from said support, a negative holder coupled to said platform and adapted to contact with said surface, said negative holder being provided with an extension, a retaining device on said platform for holding the negative holder parallel to said surface and comprising a slidable member provided with a lug adapted to come against said extension, spring means for normally maintaining said slidable member in position toward said sensitized surface, means for operating said slidable member against the spring action to bring the lug of the slidable member into contact with the extension of the negative holder, locking pins and an operating mechanism therefor carried by the saddle for locking the platform, in one position of the operating mechanism, in its position away from said sensitized surface and simultaneously unlocking the saddle and in another position thereof for locking the saddle and unlocking the platform, whereby the platform may not be moved into contact with the sensitized surface unless the saddle is locked against movement.

11. A photocomposing machine comprising a support for a sensitized surface, a monorail extending in front of said support and movable in a plane parallel thereto, a saddle slidable on said monorail, a platform on said saddle slidable toward and away from said support, a negative holder coupled to said platform and adapted to contact with said surface, said negative holder being provided with an extension, a retaining device on said platform for holding the negative holder parallel to said surface and comprising a slidable member provided with a lug adapted to come against said extension, spring means for normally maintaining said slidable member in position toward said sensitized surface, means for operating said slidable member against the spring action to bring the lug of the slidable member into contact with the extension of the negative holder, locking pins and an operating mechanism therefor carried by the saddle for locking the platform, in one position of the operating mechanism, in its position away from said sensitized surface and simultaneously unlocking the saddle and in another position thereof for locking the saddle and unlocking the platform, whereby the platform may not be moved into contact with the sensitized surface unless the saddle is locked against movement and a locking device and an operating mechanism therefor for locking the platform, in one position of the operating mechanism, in its position away from said sensitized surface and for unlocking the monorail and in another position locks the monorail and unlocks the platform whereby the platform may not be moved into contact with the sensitized surface unless the monorail is locked against movement.

MAURITZ C. INDAHL.